April 9, 1963 O. O. TATE 3,084,619
SLIDE COVERS FOR HAY BALERS
Filed April 11, 1960 2 Sheets-Sheet 1

INVENTOR.
ORPHUS O. TATE
BY Church & Church
ATTORNEYS

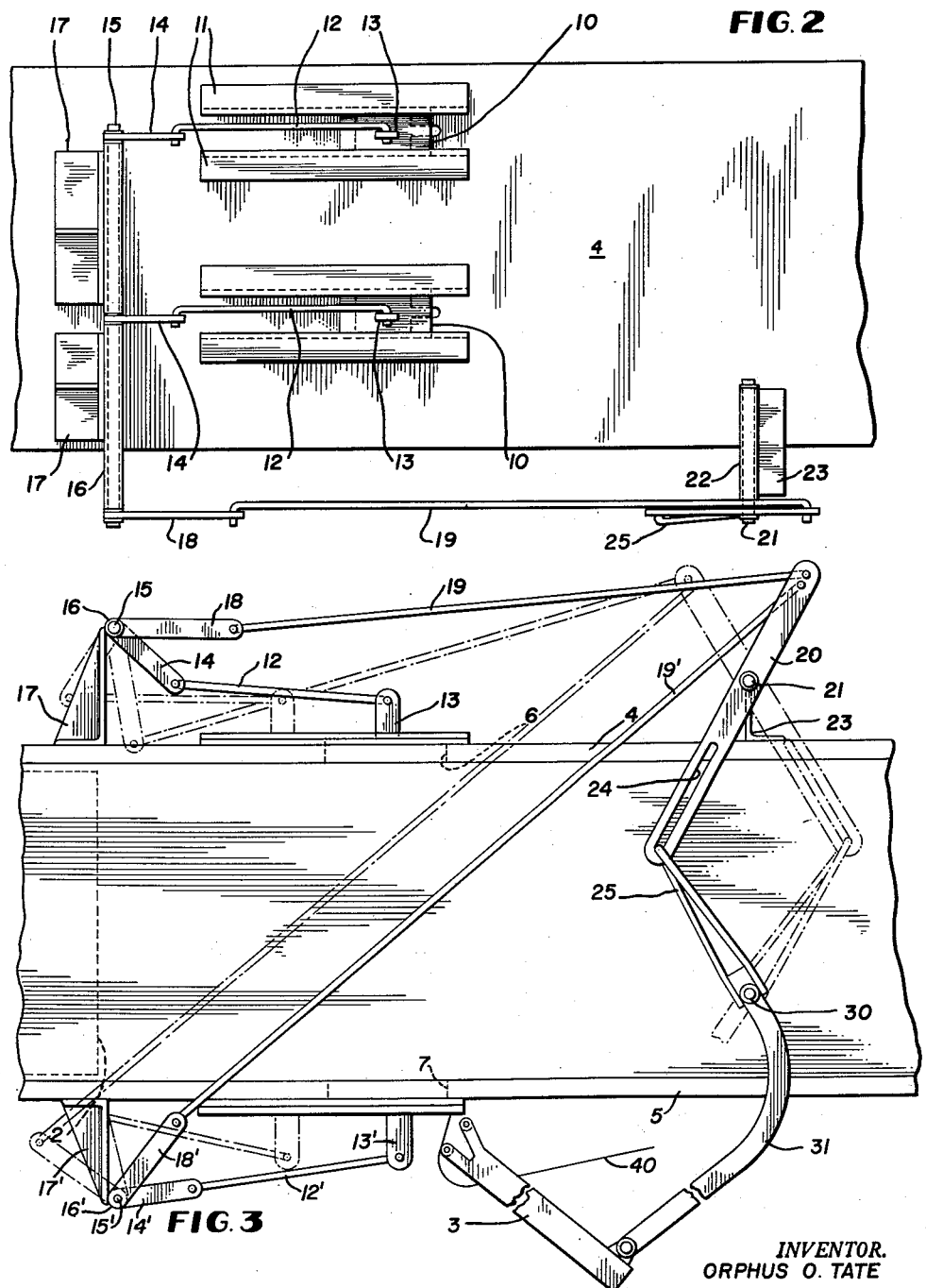

United States Patent Office 3,084,619
Patented Apr. 9, 1963

3,084,619
SLIDE COVERS FOR HAY BALERS
Orphus Odell Tate, Rte. 1, McLean, Tex.
Filed Apr. 11, 1960, Ser. No. 21,189
5 Claims. (Cl. 100—19)

This invention relates to balers for hay, straw, alfalfa and other forage crops and more specifically relates to covers and guards over the needle ports in such a baler.

In the usual type of mobile baler, the cut hay is conveyed to the bale case where it is pressed or formed into bales by a plunger which reciprocate in the bale case. To secure this bale, a tying mechanism is provided by which a cord or wire is carried across the path of the bale by a needle moving in a cyclic fashion in synchronization with the bale forming plunger. While the bale is being formed, the needle is idle and remains outside of the bale case and to accomodate movement of the needle, ports are provided on opposite sides of the bale case through which the needle enters and leaves.

In the past, it has been found that the cut hay will tend to enter and clog these ports thereby restraining movement of the needle and also clogging the tying mechanism. In some types of balers and hay binders, guards or covers have been mounted over the ports and spring biased to cover the ports until the needle enters at which time the cover or guard is pushed aside by the needle. However, such guards have been found unsatisfactory because of the excessive wear and damage caused to the needle after many cycles of operation.

It is then a primary object of this invention to provide an improved cover plate for the ports in the bale case of a baler for hay, straw, and the like.

A further object of this invention is to provide a cover plate for the needle port which will be actuated to cover and uncover the port without coming into contact with or conflicting with the cyclic movement of the needle.

A still further object of the invention is to insure synchronized movement of the cover plate out of the path of the baler needle by mounting the cover plate for sliding motion normal to the path of the needle and linking the plate to the needle drive.

In a standard hay baler, the needle drive may include an axle member in communication with any suitable driving means such that this axle member is oscillated at periodic intervals to move the needle which is either attached directly to or linked to an arm mounted on the axle member. To accomplish the objects of this invention the cover plate is slideably mounted over the needle port and also linked to the axle member, this linkage mechanism including a first pivot arm mounted for oscillation about some point intermediate its ends and containing a slot adjacent one end in which rides a driving arm that in turn is fastened directly to the axle member. The other end of the first pivot arm may be connected by a first rod member directly to the slidably mounted cover plate or through one or more additional pivot arms mounted for rotation and connected by additional rod members for movement of the cover plate upon oscillation of the axle member. With this linkage mechanism, synchronization of the movement of the cover plate with that of the needle is insured and disadvantageous contact between the needle and the cover plate is eliminated.

These and other objects, advantages and features of the invention will become apparent in the following specification taken in conjunction with the accompanying drawings, wherein:

FIGURE 2 is a detailed side elevation showing the cover plates sildeably mounted over the needle ports on one side of the bale case and the linkage mechanism which actuates movement of the plates;

FIGURE 3 is a bottom view of the bale case showing the cover plates on both sides of the bale case and the linkage mechanism connected to the needle drive.

Figure 1:
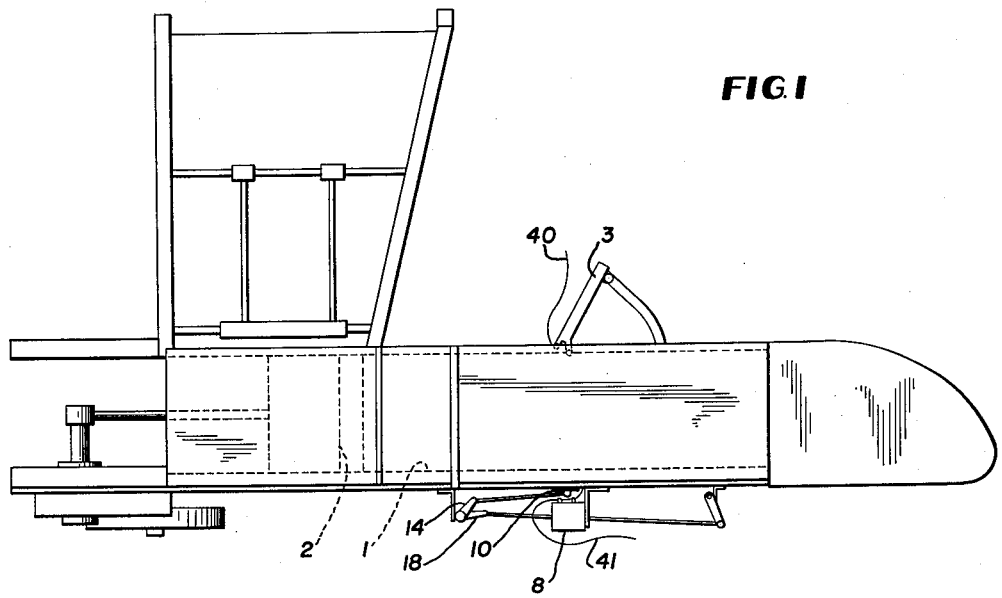
FIGURE 1 is a top view of a mobile baler showing the relation between the needle and the cover plates within the bale case.
Figure 4:
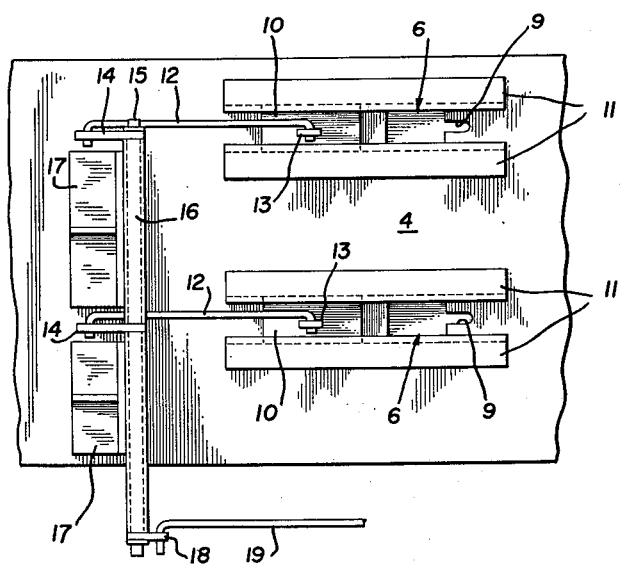
FIGURE 4 is a view similar to FIGURE 2 showing the cover plates as they appear when the needle ports are uncovered.

As shown in the drawings, bale case 1 is horizontally disposed within the mobile baler to receive plunger 2 which reciprocates within the bale case. The bale case, which is of rectangular cross-section, is formed on one side by wall 4 containing ports 6 and on the opposite side by wall 5 containing ports 7 in alignment with ports 6 and the paths of needles 3. Each needle 3 is provided to carry cord or wire 40 through port 7 and across the bale case to port 6 where wire 40 is tied to wire end 41. This tying operation may be performed by any suitable tying mechanism 8. Cover plate 10 is slideably mounted in guides 11, and slot 9 is provided in wall 4 in communication with port 6 to accommodate entrance of wire 41 into the bale case when plate 10 is in position over port 6.

A suitable linkage mechanism is provided connecting the cover plate to needle driving axle 30 which is oscillated by any suitable driving means (not shown). As shown in FIGURES 2 and 3, this linkage mechanism consists of rod 12 connected at one end to stud 13 which is fastened to plate 10 in any suitable fashion. The other end of rod 12 is connected to arm 14 which in turn is rotatably mounted on axle 15. Axle 15 is retained in tubular supports 16 which in turn are welded or otherwise fastened to brackets 17 attached on the outside of bale case 1.

Axle 15 is oscillated by movement of arm 18 connected to rod 19 which in turn is attached to pivot arm 20 rotatably mounted on pivot 21 which is held in tubular support 22. Support 22 is fastened to the outside of the bale case 1 by bracket 23. Pivot arm 20 is provided with slot 24 in which rides driving arm 25 that in turn is attached to needle support 31 and axle 30 of the needle drive.

In operation, plate 10 will normally cover port 6 in the bale case. After the bale of hay is formed by plunger 2, needle 3 enters the bale case through port 7 carrying the baling wire across the bale case to port 6. As needle 3 approaches port 6, cover plate 10 is moved away from the port by the linkage system described above and needle 3 continues across bale case to tying mechanism 8 where baling wire 40 is fastened to wire 41 by the tying mechanism after which needle 3 is withdrawn back across the bale case to the original position. As needle 3 is withdrawn, the cover plate 10 slides over port 6 being actuated by the linkage mechanism described above. At this point, a new cycle starts and plunger 2 forms a new bale making approximately 4 to 8 strokes after which the needle drive again moves needle 3 across the bale case and the cycle is continued.

While plates 10 have been described only as covering ports 6, similar plates and actuating means may be provided for ports 7 as shown in FIG. 3 wherein like numerals have been used to designate similar parts.

While I have disclosed but one embodiment of my invention, it will be apparent to those skilled in the art that various changes and modifications may be made therein without departing from the scope of the invention.

I claim:
1. In a baler having a bale case in which a bale forming plunger reciprocates, bale tying means including a needle and means for driving the needle through the bale case and across the path of the plunger from a starting position at one side of the bale case to a tying position at the opposite side of the bale case, the opposite sides of the bale case being provided with ports through which the needle enters and leaves the bale case, means for covering and uncovering of said ports in synchronization with the needle movement to prevent material being compressed in said bale case from passing through said ports comprising a support mounted on the outside of said bale case, a plate slidably mounted on said support and having a first position substantially completely covering said port when said needle is in said starting position and a second position clear of said port, and a linkage mechanism connecting said plate to the needle drive to move said plate between said first and second positions.

2. The invention of claim 1 wherein the linkage mechanism includes a pivot arm mounted at some point intermediate the ends of the arm for oscillation about said point, the arm containing a slot adjacent one end of said arm, an axle member oscillated by the needle drive and a driving arm fastened to said axle to ride in said slot to pivot the pivot arm upon oscillation of the axle member.

3. The invention of claim 1 wherein the linkage mechanism includes a first pivot arm mounted at some point intermediate the ends of the arm for oscillation about said point, the arm containing a slot adjacent one end of said arm, an axle member oscillated by the needle drive, a driving arm fastened to said axle member to ride in said slot to pivot the first pivot arm upon oscillation of the axle member, a second pivot arm mounted for rotation, a first rod member connecting the first and second pivot arms, a third pivot arm mounted for rotation about an axis common with the second pivot arm and fixed in relation to the second pivot arm and a second rod member connecting the slideable plate to the third pivot arm for movement of said plate upon oscillation of said axle member.

4. In a baler having a base case in which a bale-forming plunger reciprocates, bale tying means including a needle and means for driving the needle through the bale case and across the path of the plunger from a starting position at one side of the bale case to a tying position at the other side of the bale case, the opposite sides of the bale case being provided with ports through which the needle enters and leaves the bale case, means preventing material being compressed in said bale case from passing through said ports when said needle is in said starting position comprising plates slideably mounted to substantially completely cover said ports and means to actuate said slideable plates to uncover and cover said ports in synchronization with the needle movement.

5. In a baler having a bale case, a bale forming plunger reciprocally movable in said bale case, bale tying means including a needle and means for driving the needle through the bale case and across the path of the plunger from a starting position at one side of the bale case to a tying position at the opposite side of the bale case, ports formed in the sides of the bale case providing a passage through said bale case for said needle, means preventing material being compressed in said bale case from passing through said ports comprising a supported mounted on the outside of said bale case, a plate slidably mounted on said support, means for moving said plate between a first position substantially completely covering one of said ports when said needle is in said starting position and a second position clear of said port, and means for synchronizing the movement of said plate with the movement of said needle.

References Cited in the file of this patent

UNITED STATES PATENTS

| | | |
|---|---|---|
| 878,445 | Zimmerman | Feb. 4, 1908 |
| 947,039 | Hart | Jan. 18, 1910 |
| 1,076,834 | Lamar | Oct. 28, 1913 |
| 1,889,372 | Nolan | Nov. 29, 1932 |
| 2,591,970 | Seegers et al. | Apr. 8, 1952 |
| 2,621,588 | McClellan et al. | Dec. 16, 1952 |
| 2,733,652 | Dwyer | Feb. 7, 1956 |